Patented Dec. 23, 1941

2,267,204

UNITED STATES PATENT OFFICE 2,267,204

INSECTICIDE

Lucas P. Kyrides, Webster Groves, Mo., assignor to Monsanto Chemical Company, St. Louis, Mo., a corporation of Delaware No Drawing. Application July 30, 1938,
Serial No. 222,115

17 Claims. (Cl. 167—22)

The present invention relates to a new class of insecticides of the contact and stomach-poison type and involves the discovery that certain alkylated alkylene polyamines are outstandingly useful for purposes of controlling plant pests, especially piercing or sucking insects.

The principal object of this invention is to provide a class of insecticides useful for the destruction of insects by poisoning, which insecticides shall be safe to use and handle by human beings and shall have no substantial deleterious effect on growing plants. It is a further object of the invention to provide a method of formulating the insecticides to attain most favorably these objects and to permit of most advantageous application of the insecticide to growing plants. Other objects and advantages of the invention will be apparent from the description which follows hereinafter.

The present invention is based on the discovery that certain N-alkylated alkylene polyamines are better and more effective insecticides in many instances than known insecticides. The N-alkylated alkylene polyamines contemplated by the present invention have at least one alkyl group which contains from 6 to 20 carbon atoms joined to one of the amino nitrogen groups and having one, two, three or four alkylene groups interconnected by nitrogen atoms. They may be represented structurally in their simpler form as follows:

in which R is an alkylene radical which may be the ethylene radical (—CH$_2$CH$_2$—), the propylene radical (—CH$_2$CH(CH$_3$)—), the trimethylene radical (—CH$_2$CH$_2$CH$_2$—) or a mixture of such radicals and $n$ may be 0, in which case the bracketed group is nonexistent or $n$ may be a whole number from 1 to 3; and X is hydrogen or an alkyl radical which may range from methyl to eicosyl (C$_{20}$H$_{41}$—) and Y is an alkyl group having from 8 to 20 carbon atoms. Both X and Y may preferably be the normal (straight chain) alkyl groups; however, forked or branched chain alkyl groups may be employed. Unlike nicotine, my insecticides are used as free bases and not as salts with mineral acids in which form their effectiveness is seriously impaired.

Examples of specific compounds whose use is contemplated herein are N-octyl ethylene diamine, N-2-ethylhexyl ethylene diamine, N-decyl ethylene diamine, N-tetradecyl ethylene diamine, N,N'-dibutyl ethylene diamine, N,N'-didodecyl ethylene diamine, N-butyl-N'-decyl ethylene diamine, N-dodecyl diethylene triamine, N-tetradecyl diethylene triamine, N-hexadecyl triethylene tetramine, N-tetradecyl trimethylene diamine, N-tetradecyl propylene diamine. Mixtures of such compounds consisting either of compounds derived from the same alkylene polyamine with different alkyl substituents, such as would result on treating ethylene diamine with mixed alkyl chlorides, or mixtures of varying degrees of alkylation or mixtures containing compounds derived from different alkylene polyamines with the same or different or mixed alkyl substituents are also contemplated for use herein.

Various methods of preparing compounds suitable for use according to this invention are known. A preferred method of preparing the compounds consists in alkylating the alkylene polyamines by means of an alkyl chloride. Long-chain alkyl chlorides may be obtained by treating alcohols with an agent such as thionyl chloride. Lauryl (n-dodecyl) chloride, for example, can be obtained by treating with thionyl chloride the lauryl alcohol fraction derived from the hydrogenation of cocoanut fatty acids. Mixtures of alcohols containing alcohols having from 10 to 16 carbon atoms consisting predominantly of even-numbered carbon-atom alcohols may be used for obtaining corresponding mixed alkyl chlorides and alkylated alkylene polyamines. These mixed alkylated alkylene polyamines are for some purposes as suitable for use in the invention as the compounds derived from a single isomer or homologue.

The alkyl chlorides can be made by other methods, for example, by means of the reaction of alcohols with dry hydrogen chloride using zinc chloride as a catalyst or by direct chlorination of paraffin hydrocarbons.

The alkylene polyamine is alkylated by heating with the alkyl chloride even without pressure; superatmospheric pressure and elevated temperatures may be used advantageously.

The extent to which alkylation is conducted determines the relative amounts of mono- and poly-alkyl substitution. For my purpose I may and sometimes actually prefer to use a mixture of the mono- and poly-alkyl-substituted alkylene polyamines. Where a mono- or poly-alkyl alkylene polyamine in pure form is required it may be isolated by fractional distillation.

An example of a method of preparing a typical compound of the invention, N-n-hexadecyl triethylene tetramine,

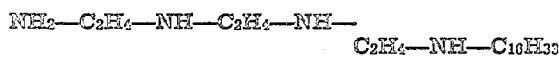

follows: A fraction of alkyl chlorides (boiling at 150° to 160° C. at a pressure of 2 to 3 mm.) obtained by reaction with thionyl chloride of the fraction of fatty alcohols derived from hydrogenation of cocoanut fatty acids having a boiling point of 180° to 185° C. at a pressure of 15 mm. was used. This fraction of the alcohols corresponded approximately to n-hexadecyl alcohol and the alkyl chloride formed was substantially pure n-hexadecyl chloride. One mol of this hexadecyl chloride was heated at about 150° C. with about five mols of triethylene tetramine for about 5 hours. The reaction mixture, on cooling, separates into two layers. The upper layer contains the desired reaction product and is distilled under vacuum to separate the unreacted triethylene tetramine. The resulting hexadecyl triethylene tetramine was purified by distillation under vacuum. Its boiling point is approximately 230° to 250° C. at a pressure of 2 to 3 mm. and it is a viscous oil which dissolves in water with a most persistent foam.

In a similar manner other N-alkylated alkylene polyamines may be prepared from corresponding alkylene polyamines and alkyl chlorides. The boiling points of several of these substantially pure N-alkylated alkylene polyamines prepared in this manner are as follows (properties of other compounds of the series are described hereinafter):

| | Boiling point |
|---|---|
| N-n-octyl ethylene diamine | 118°–121° C./10 mm. |
| N-2-ethylhexyl ethylene diamine | 108°–110° C./12 mm. |
| N-n-decyl ethylene diamine | 140°–145° C./9 mm. |
| N-n-tetradecyl ethylene diamine | 187°–191° C./9 mm. |
| N,N'-di-(n-butyl) ethylene diamine | 110°–115° C./15 mm. |
| N-n-dodecyl diethylene triamine | 204°–206° C./8 mm. |
| N-n-tetradecyl diethylene triamine | 190°–197° C./2 mm. |

These N-alkylated alkylene polyamines, when used as insecticides, are characterized by a high potency toward sucking or piercing insects, notably the red spiders and aphids, while at the same time they have no substantial deleterious action on growing plants. The tables which follow illustrate the superiority of the alkyl derivatives over the corresponding acyl derivatives and indicate the results of determinations of the minimum lethal dosages of alkylated and acylated alkylene polyamines toward the red spider, *Tetranychus telarius*, and the aphid, *Myzus porosus*. In all cases the acylated alkylene polyamines caused excessive burning of the foliage and could not be used successfully as insecticides for application to growing foliage, plants and flowers.

*I. Acylated alkylene polyamines*

| Compound | Minimum lethal dosage | Test insect |
|---|---|---|
| | *Percent* | |
| N-n-dodecanoyl ethylene diamine | 0.125 | Red spider on rose. |
| N-n-dodecanoyl ethylene diamine hydrochloride | 0.2 | Do. |

*II. Alkylated alkylene polyamines*

| Compound | Minimum lethal dosage | Test insect |
|---|---|---|
| | *Percent* | |
| N-n-dodecyl ethylene diamine | 0.085 | Red spider on rose. |
| Do | 0.1 | Aphid on rose. |
| N-n-octyl ethylene diamine | 0.2 | Red spider on rose. |
| N-n-decyl ethylene diamine | 0.125 | Do. |
| N-n-decyl diethylene triamine | 0.1 | Do. |
| N-n-tetradecyl ethylene diamine | 0.085 | Do. |
| N-n-tetradecyl diethylene triamine | 0.085 | Do. |
| N-n-octadecyl triethylene tetramine | >0.125 | Do. |
| N-n-hexadecyl triethylene tetramine | >0.1 | Do. |

Minimum lethal dosages in these tests represents that concentration of insecticide in solution or emulsion (represented as %) which when applied thoroughly by spraying in the form of a solution or emulsion to the plant (rose) infested with the insect (red spider) will produce a 99% or better kill of those insects which were in the mobile stage.

My insecticides are more effective against red spider than nicotine or any other insecticides in commercial use which can be applied to growing plants without producing deleterious action on the plants. Such insecticides include such commercial products as beta-butoxy-beta'-thiocyano diethyl ether, n-dodecyl thiocyanate and potassium ammonium selenosulfide.

The effectiveness of the insecticidal compounds increases with the length of the alkyl chain substituted in the alkylene polyamine, thus N-n-tetradecyl ethylene diamine is about 2.3 times as effective as N-n-octyl ethylene diamine. Furthermore, one long chain substituted into the alkylene polyamine is more effective than two or more short chains with the same total number of carbon atoms. Thus, for example, at a dilution of 1 to 600 N-n-octyl ethylene diamine produces a 99% kill of the red spider, *Tetranychus telarius*, whereas at the same dilution N,N'-di-n-butyl ethylene diamine is relatively ineffective.

In preparing insecticides from the alkylated alkylene polyamines it is not necessary to use individual pure compounds. Crude reaction mixtures are in some cases more toxic to insects and less injurious to plants than more highly purified materials. This is illustrated in the following results, in which three mixtures were prepared from the crude mixture of higher fatty alcohols known as "Lorol," consisting of alcohols having from approximately 10 to 16 carbon atoms in the molecule, predominantly those having an even number of carbon atoms. This alcohol mixture was converted to the corresponding mixture of alkyl chlorides which was then used for alkylating various alkylene polyamines. In this way three crude mixtures were prepared, the first of which was a "Lorol" ethylene diamine and the second of which was a "Lorol" diethylene triamine, both of which contained both mono- and di-alkylated compounds. The third mixture was a purified "decyl-tetradecyl" diethylene triamine having a boiling point range of 150° to 200° C. at a pressure of 5 mm. containing only mono-alkylated compounds resulting from alkylation with a mixture of alkyl chlorides containing from 10 to 14 carbon atoms in the molecule prepared from the fraction of "Lorol" consisting of alcohols containing from 10 to 14 carbon atoms. These three mixtures were then tested for toxicity toward the red spider, *Tetranychus telarius*, against which they produced the kills indicated when diluted with water to the designated concentrations.

| Compound | Concentration | Kill |
|---|---|---|
| | | Percent |
| Mono and di "Lorol" ethylene diamine | 1-1,200 | 94 |
| | 1-1,500 | 79 |
| | 1-1,060 | 100 |
| Mono and poly "Lorol" diethylene triamine | 1-1,200 | 96 |
| | 1-1,400 | 93 |
| | 1-1,600 | 50 |
| | 1- 800 | 100 |
| Mono-decyl-tetradecyl diethylene triamine | 1-1,000 | 93 |
| | 1-1,200 | 79 |
| | 1-1,500 | 28 |

The alkylated alkylene polyamines have no substantial deleterious action on plant foliage, accordingly no syringing of the plants is required after application of an insecticidal spray thereto, as is frequently necessary with other insecticides.

In general, the method of applying the insecticides of the present invention is analogous to that employed with other insecticides such as nicotine, pyrethrum, rotenone, etc. The invention in its broadest aspect is not limited to any specific method of application.

In preparing insecticidal sprays from the alkylated alkylene polyamines the water-soluble lower members of the series may be dissolved in water and used in solution. Most of the lower members of the series are soluble to the extent required for producing a solution having an effective toxic concentration for insecticidal use, which is an advantage of these compounds. Those which are insoluble in water will emulsify therein, however. As an alternative procedure which I may employ to advantage and which is applicable to the water-soluble as well as to the water-insoluble alkylated alkylene polyamines is to prepare a solution of the polyamine in an oil such as white mineral oil and thereafter emulsify this oil solution in water. The alkylated alkylene polyamines are soluble in oils and hydrocarbon solvents and furthermore act as emulsifying agents, producing stable insecticidal emulsions. Self-emulsifying oil compositions can thus be prepared and marketed and shipped as such. In using such self-emulsifying oil compositions the composition need only be dispersed in water to form an emulsion of the desired toxicity and applied in emulsified form to growing plants by spraying or other method.

The alkylated alkylene polyamines of the present invention are excellent emulsifying agents and can be used for preparing emulsions of other insecticides such as pyrethrins, rotenone, derris resins and other tubatoxic materials, as well as beta-butoxy-beta'-thiocyano-diethyl ether and n-dodecyl thiocyanate, which are not emulsifiable or are difficultly emulsifiable. They are especially satisfactory emulsifying agents for insecticides derived from cyclohexylamine, such as N-alkyl-N-benzyl cyclohexylamines, which do not produce satisfactory emulsions with sulfonated castor oil and other sulfonated vegetable oils, sulfated higher alcohols or alkyl benzene, naphthalene and diphenyl sulfonic acids. However, when N-amyl-N-benzyl cyclohexylamine is emulsified with the aid of an alkylated alkylene polyamine the emulsion obtained is of excellent quality for spray purposes. The alkylated alkylene polyamines are soluble in the N-alkyl-N-benzyl-cyclohexylamines and hence self-emulsifying solutions of the two may be prepared and emulsified with water as desired for use. Various other constituents may be added to the emulsions in known manners. The addition of alkaline substances such as ammonia and cyclohexylamine increases the stability of the emulsions and reduces tendency to flocculate on dispersion in water. Pine oil is also a desirable additional constituent of such emulsions. A solution consisting of 70 parts by volume of N-amyl-N-benzyl-cyclohexylamine, 20 parts of "Lorol" diethylene triamine, and 10 parts of pine oil is a typical example of a desirable formulation which gives a good emulsion for spray purposes. When emulsified with water its toxicity at various dilutions toward the red spider is as follows (the dilutions represent parts of the above solution in parts of water by volume):

| Dilution | Kill |
|---|---|
| | Percent |
| 1-400 | 100 |
| 1-600 | 97 |
| 1-800 | 90-100 |

The results obtained on dissolving 5 parts of various emulsifying agents in 95 parts of N-amyl-N-benzyl cyclohexylamine and thereafter attempting to emulsify 1 part of the composition in 500 parts of water by stirring were as follows:

A. *Alkylene polyamine salts with acids*

(1) Ethylene diamine oleate — (1) Poor solubility and very poor emulsion (2) Ethylene diamine dioleate — (2) Soluble but very poor emulsion (3) Diethylene triamine oleate — (3) Difficultly soluble and only fair emulsion (4) Diethylene triamine dioleate — (4) Poor solubility and no emulsion (5) Triethylene tetramine oleate — (5) Soluble but only fair emulsion (6) Triethylene tetramine dioleate — (6) Difficultly soluble and no emulsion (7) Triethylene tetramine laurate — (7) Insoluble in cold and no emulsion (8) Triethylene tetramine dodecyl benzene sulfonate — (8) No clear solution and poor emulsion B. *Acylated alkylene polyamines*

(9) N-n-Decanoyl ethylene diamine — (9) Good solubility but no emulsion

C. N-alkylated polyalkylene polyamines

(10) N-n-Tetradecyl diethylene triamine — (10) Good solubility and good emulsion

(11) N-n-Hexadecyl triethylene tetramine — (11) Good solubility and good emulsion

(12) N-n-Dodecyl diethylene triamine — (12) Good solubility and good emulsion

The solubility of the compounds indicated refers to their solubility in N-amyl-N-benzyl cyclohexylamine. Emulsions formed with the alkylene polyamine salts of fatty acids precipitate as insoluble salts in hard water. From the foregoing results the superiority of the alkylated polyamine compounds as emulsifying agents is evident and such results are indicative of the method of using the compounds as emulsifying agents or in the preparation of self-emulsifying oils, particularly for producing oil-water emulsions, especially for use in the dry-cleaning industry.

Furthermore, it has been discovered that although both N-alkyl-N-benzyl cyclohexylamines and alkylated alkylene polyamines are each alone effective insecticides, a mixture of the two is more toxic than either of the individual constituents. The two constituents exert a synergistic action upon each other. The optimum synergistic effect appears at a ratio of about 3.5 parts of N-amyl-N-benzyl-cyclohexylamine to 1 part of the alkylated alkylene polyamines. When used in this manner "Lorol" ethylene diamine (consisting of mono- and di-alkylated products, the alkyl groups of which contain from 10 to 16 carbon atoms), "Lorol" diethylene triamine (consisting of mono- and di-alkylated products, the alkyl groups of which contain from 10 to 16 carbon atoms) and the decyl-tetradecyl diethylene triamine have substantially the same synergistic effectiveness.

In formulating insecticidal emulsions comprising mixtures of alkylated alkylene polyamines and N-amyl-N-benzyl-cyclohexylamine, not only is it desirable to consider the emulsifying effect of the diamine or triamine but also its synergistic action and the formulation of 70 parts by volume of N-amyl-N-benzyl cyclohexylamine, 20 parts of "Lorol" diethylene triamine and 10 parts of pine oil illustrated above is one which takes advantage of both the optimum range of the synergistic effect and an effective emulsifying action. Their optimum ratios will vary somewhat with the individual members of each series of compounds but can easily be determined from preliminary tests in known manner.

The N-alkylated alkylene polyamines contemplated by my invention can be used to emulsify other oils. Since these compounds are soluble in a wide variety of vegetable and mineral oils and in hydrocarbon and other organic solvents and emulsify such materials they can be used to form self-emulsifying compositions, that is, compositions which, when added to water, need no additional agent to produce a stable emulsion. Examples of such compositions follow hereinbelow:

The following emulsions were prepared by dissolving 4 parts of decyl-tetradecyl diethylene triamine in 100 parts of the organic solvent indicated. One to 2 cc. of each solution were added to 50 cc. of water and the mixture stirred and watched for about 4 hours. The emulsions had the characteristics indicated. * * *

| | |
|---|---|
| Carbon tetrachloride | Excellent emulsion, which settles on standing. |
| ortho-Dichlorobenzene | Good emulsion, but settles on standing. |
| Benzene | Excellent emulsion, no settling. |
| Xylene | Excellent emulsion, no settling. |
| White mineral oil | Fair emulsion, which separates on standing. |
| Kerosene | Fair emulsion, which separates on standing. |
| Raw linseed oil | Good emulsion, which separates on standing. |
| Cottonseed oil | Good emulsion, which separates on standing. |
| Turpentine | Excellent. No separation. |

Reference is made to my Patent No. 2,244,712 which discloses and claims the use of the hereindescribed alkylated alkylene polyamines as repellents for ambrosia beetles.

Although the above specification comprises preferred embodiments of the invention selected for purposes of illustration it is to be understood that the invention is not thereby limited and that modifications and changes may be made therein in known manner without departing substantially from the scope of the appended claims.

I claim:

1. An insecticidal composition comprising an N-alkylated alkylene polyamine selected from the group consisting of N-alkylated ethylene diamines, propylene diamines, trimethylene diamines, diethylene triamines, dipropylene triamines, triethylene tetramines and tripropylene tetramines in which at least one of the alkyl groups contains more than 7 and less than 21 carbon atoms.

2. An insecticidal composition comprising an N-alkylated alkylene polyamine of the general formula

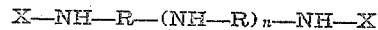

$$X-NH-R-(NH-R)_n-NH-X$$

in which R is an alkylene radical selected from the group consisting of ethylene, trimethylene and propylene radicals, X is selected from the group consisting of hydrogen and alkyl radicals having less than 21 carbon atoms, at least one of which is an alkyl radical having more than 7 carbon atoms, and n is a number from 0 to 2.

3. An insecticidal aqueous emulsion comprising an active insecticidal substance and an emulsifying agent therefor consisting of an N-alkylated alkylene polyamine as defined in claim 2.

4. An insecticidal composition comprising an aqueous emulsion of an N-alkyl-N-benzyl cyclohexylamine and an emulsifying agent consisting of an N-alkylated alkylene polyamine as defined in claim 1.

5. An insecticidal composition comprising an aqueous emulsion of an N-alkyl-N-benzyl cyclohexylamine and an emulsifying agent consisting of an N-alkylated alkylene polyamine as defined in claim 2.

6. An oil-water emulsion containing as an emulsifying agent an N-alkylated alkylene polyamine as defined in claim 1.

7. An oil-water emulsion containing as an emulsifying agent an N-alkylated alkylene polyamine as defined in claim 2.

8. An insecticidal composition comprising a mixture of an N-alkyl-N-benzyl cyclohexylamine and an N-alkylated alkylene polyamine as defined in claim 1.

9. An insecticidal composition comprising a mixture of an N-alkyl-N-benzyl cyclohexylamine and an N-alkylated alkylene polyamine as defined in claim 2.

10. An insecticidal composition comprising an N-dodecyl ethylene diamine.

11. An insecticidal composition comprising an N-n-tetradecyl diethylene triamine.

12. An insecticidal composition comprising an N-n-dodecyl diethylene triamine.

13. An insecticidal composition comprising a mixture of N-alkylated alkylene polyamines in which the alkyl groups have from 10 to 16 carbon atoms.

14. An insecticidal aqueous emulsion comprising as an insecticide an N-alkyl-N-benzyl cyclohexylamine and an emulsifying agent therefor consisting of an N-alkylated alkylene polyamine as defined in claim 2 in a concentration sufficient to impart a synergistic effect to the insecticide.

15. An insecticidal aqueous emulsion comprising as an insecticide an N-amyl-N-benzyl cyclohexylamine and an emulsifying agent therefor consisting of an N-alkylated alkylene polyamine as defined in claim 2 in a concentration sufficient to impart a synergistic effect to the insecticide.

16. An insecticidal composition comprising an emulsion of N-amyl-N-benzyl cyclohexylamine and an emulsifying agent consisting of N-dodecyl-ethylene diamine.

17. An insecticidal emulsion comprising a mixture of an N-alkyl-N-benzyl cyclohexylamine and an N-"lorol" ethylene diamine.

LUCAS P. KYRIDES.